(12) United States Patent
Tinkler et al.

(10) Patent No.: US 7,852,391 B2
(45) Date of Patent: Dec. 14, 2010

(54) SUBSTITUTION OF DEFECTIVE READOUT CIRCUITS IN IMAGERS

(75) Inventors: Rosanne H Tinkler, Lexington, MA (US); Allen W Hairston, Andover, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 305 days.

(21) Appl. No.: 11/011,841

(22) Filed: Dec. 14, 2004

(65) Prior Publication Data

US 2006/0125940 A1    Jun. 15, 2006

(51) Int. Cl.
H04N 5/335 (2006.01)
H04N 5/217 (2006.01)
H04N 9/64 (2006.01)
H01L 27/00 (2006.01)
H04N 5/228 (2006.01)

(52) U.S. Cl. ............... 348/302; 348/319; 348/241; 348/246; 250/208.1

(58) Field of Classification Search ......... 348/302–304, 348/307–310, 320–323; 250/208.1
See application file for complete search history.

(56) References Cited

U.S. PATENT DOCUMENTS

| | | | |
|---|---|---|---|
| 4,719,601 A | 1/1988 | Gray et al. | |
| 5,168,468 A | 12/1992 | Magome et al. | |
| 5,231,604 A | 7/1993 | Watanabe | |
| 5,485,425 A | 1/1996 | Iwai et al. | |
| 5,896,327 A | 4/1999 | Yang | |
| 6,205,515 B1 | 3/2001 | Huang | |
| 6,512,218 B1* | 1/2003 | Canini et al. | 250/208.1 |
| 6,573,936 B2* | 6/2003 | Morris et al. | 348/294 |
| 6,611,288 B1* | 8/2003 | Fossum et al. | 348/246 |
| 6,625,318 B1* | 9/2003 | Tan et al. | 382/224 |
| 6,661,457 B1* | 12/2003 | Mathur et al. | 348/273 |
| 7,554,589 B2* | 6/2009 | Boemler | 348/302 |
| 2002/0001896 A1 | 1/2002 | Yoon | |
| 2002/0017666 A1* | 2/2002 | Ishii et al. | 257/291 |
| 2002/0108073 A1 | 8/2002 | Hughes | |
| 2003/0025658 A1 | 2/2003 | Janssen et al. | |
| 2003/0035319 A1 | 2/2003 | Abedifard et al. | |
| 2003/0043656 A1 | 3/2003 | Abedifard et al. | |
| 2003/0179643 A1 | 9/2003 | Winograd et al. | |
| 2004/0036788 A1 | 2/2004 | Chapman et al. | |
| 2005/0145777 A1* | 7/2005 | Barna et al. | 250/208.1 |

OTHER PUBLICATIONS

Conboy, Barbara, "About MODIS", http://modis.gsfc.gov, pp. 1-2.
Audet, Yves et al., "Design of a Self-Correcting Active Pixel Sensor", pp. 1-9.
"Front-End Readout Chips", http://scipp.ucsc.edu, pp. 1-8.
Johnson, Robert P., "GLAST Silicon Microstrip Tracker Electronics", http://scipp.ucsc.edu, Nov. 1997, pp. 1-15.

* cited by examiner

*Primary Examiner*—David L Ometz
*Assistant Examiner*—Carramah J Quiett
(74) *Attorney, Agent, or Firm*—Vern Maine & Associates (57) ABSTRACT

An imaging system configured with readout circuit redundancy is disclosed. Pixel data from a particular column can be steered around a defective readout circuit to an operational readout circuit. Thus, larger imaging arrays which are generally more prone to common column circuitry defects are enabled. In addition, imaging systems configured with significant on-chip signal processing, which are also more prone to common column circuitry defects, are enabled. The occurrence of lost pixel data from an entire column is eliminated or otherwise reduced, thereby increasing overall operability and yield of the imaging system. The system can be implemented on a single chip or a chip set.

13 Claims, 8 Drawing Sheets

| Sub-Module/ Readout Circuit Pair | Readout Circuit Status | 3-Bit Column Select Code | Switch | Detector Column Bus |
|---|---|---|---|---|
| N-5 | OK | 1 1 1 | 7 | Y-2 |
| N-4 | Defective | increment | None | None |
| N-3 | OK | 1 1 0 | 6 | Y-1 |
| N-2 | Defective | increment | None | None |
| N-1 | Defective | increment | None | None |
| N | OK | 1 0 0 or 0 0 0 | 4 or 0 | Y |
| N+1 | Defective | increment | None | None |
| N+2 | OK | 0 0 1 | 1 | Y+1 |
| N+3 | Defective | increment | None | None |
| N+4 | OK | 0 1 0 | 2 | Y+2 |
| N+5 | Defective | increment | None | None |
| N+6 | OK | 0 1 1 | 3 | Y+3 |

3-Bit Column Select Code Key:

a b c (e.g., 1 1 1)

a b → Magnitude of Sub-Module/Readout Circuit Pair Shift (relative to Sub-Module/Readout Circuit Pair N)

c → Direction of Sub-Module/Readout Circuit Pair Shift (relative to Sub-Module/Readout Circuit Pair N)

SUBSTITUTION OF DEFECTIVE READOUT CIRCUITS IN IMAGERS

FIELD OF THE INVENTION

The invention relates to imagers, and more particularly, to the substitution of defective readout circuits of an imaging system.

BACKGROUND OF THE INVENTION

Focal plane arrays and other such imaging devices are generally associated with a readout circuit. The imaging array is divided up into columns of detectors, with each detector representing a pixel of the array. The detectors may be, for example, quantum well infrared photodetectors (QWIPs) or charge coupled devices (CCDs) or microbolometers. Each of the detectors in any one column of the array is associated with a common readout circuit. The array and the readout circuit are typically implemented on separate chips.

In operation, light (e.g., infrared) impinges on the array, thereby causing each of the illuminated pixels of the array to generate an analog detection signal. Each analog detection signal is then sent to a corresponding readout circuit, where it is processed (e.g., integrated, amplified, filtered, and converted to its digital equivalent). The digitized pixel data can then be processed as necessary (e.g., image formation and artifact removal), as is conventionally done. The image processing circuitry is usually implemented on a separate chip.

A common problem with conventional array and readout circuit designs is related to the common readout circuitry associated with any one column of detectors. In particular, a functional defect in the common readout circuitry effectively eliminates data from every detector or pixel in the column associated with that common readout circuitry. Although the overall array can still function with such column outages, image data from the detected scene is lost, thereby degrading image quality. In addition, certain imaging applications in the military and commercial sectors (e.g., targeting and surveillance) may be intolerant of such data loss.

What is needed, therefore, is an imaging system that is less prone to data loss resulting from defective readout circuitry.

SUMMARY OF THE INVENTION

One embodiment of the present invention provides an imaging system with redundant readout capability. The system includes a focal plane array having a plurality of detector columns, and a column steering module. The column steering module is configured to receive output from each of the detector columns, and to switch the output from each of the detector columns to two or more readout circuits. The system may further include a number of readout circuits operatively coupled to the column steering module, wherein the number of readout circuits is at least one greater than the number of detector columns.

The system may further include an image processor adapted to receive readout circuit output, and to perform image processing. The system may further include a diagnostic processor adapted to identify defective readout circuits. The system may further include a control processor adapted to control the switching performed by the column steering module. The system can be implemented, for example, as an integrated circuit chip or chip set.

Another embodiment of the present invention provides an imaging system with redundant readout capability. The system includes a switch select circuit, and a plurality of switches responsive to the switch select circuit, so as to selectively couple each detector column output of an imaging array to two or more readout circuits. The system may further includes a number of readout circuits operatively coupled to the plurality of switches, wherein the number of readout circuits is at least one greater than the number of detector columns.

The system may further include an image processor adapted to receive readout circuit output, and to perform image processing. The system may further include a diagnostic processor that is operatively coupled to the switch select circuit, and adapted to identify defective readout circuits. In one particular embodiment, the switch select circuit includes a control processor that is adapted to control the selective coupling of detector column outputs to readout circuits.

The system can be implemented, for example, as an integrated circuit chip or chip set, and further include an on-chip image processor adapted to receive readout circuit output, and to perform image processing, as well as a on-chip control processor operatively coupled to the switch select circuit, and adapted to control the selective coupling of detector column outputs to readout circuits. One particular configuration of the system includes a number of readout circuits operatively coupled to the plurality of switches, (wherein the number of readout circuits is at least one greater than the number of detector columns), and an on-chip image processor adapted to receive readout circuit output, and to perform image processing.

Another embodiment of the present invention provides an imaging system that includes a primary readout circuit adapted to receive and process image data from an imaging array, and a redundant readout circuit for replacing the primary readout circuit if that primary readout circuit fails. The system may further include an imaging array adapted to generate the image data of a scene. The system may further include an image processor adapted to receive readout circuit output, and to perform image processing. The system may further include a diagnostic processor adapted to identify defective readout circuits. The system may further include a control processor adapted to control when the redundant readout circuit replaces the primary readout circuit. One particular configuration includes an image processor adapted to receive readout circuit output and to perform image processing, and a control processor adapted to control when the redundant readout circuit replaces the primary readout circuit.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 2c illustrates an example shift register structure and functionality for a column steering module shown in FIG. 2a.

FIG. 3b illustrates example shift register structure and functionality for the column steering module shown in FIG. 3a.

DETAILED DESCRIPTION OF THE INVENTION

Embodiments of the present invention provide a mechanism for selectively connecting detector columns of a focal plane array with operational readout circuits. Detector column addressing is enabled so that pixel data from a particular column can be mapped and steered around a defective readout circuit to a replacement readout circuit. Thus, larger imaging arrays that are generally more prone to common column circuitry defects are enabled. In addition, imaging systems configured with significant on-chip signal processing, which are also more prone to common column circuitry defects, are enabled.

The principles described herein can be implemented on a single chip or a chip set. The column steering mechanisms effectively provide redundancy in the readout circuitry, and the occurrence of lost pixel data from an entire column is substantially reduced, thereby increasing overall operability and yield of the imaging system. The column steering circuitry used in conjunction with conventional imaging techniques can be effectively deployed in a number of applications, such as in cameras used for commercial and military purposes.

System Overview

Figure 1A:
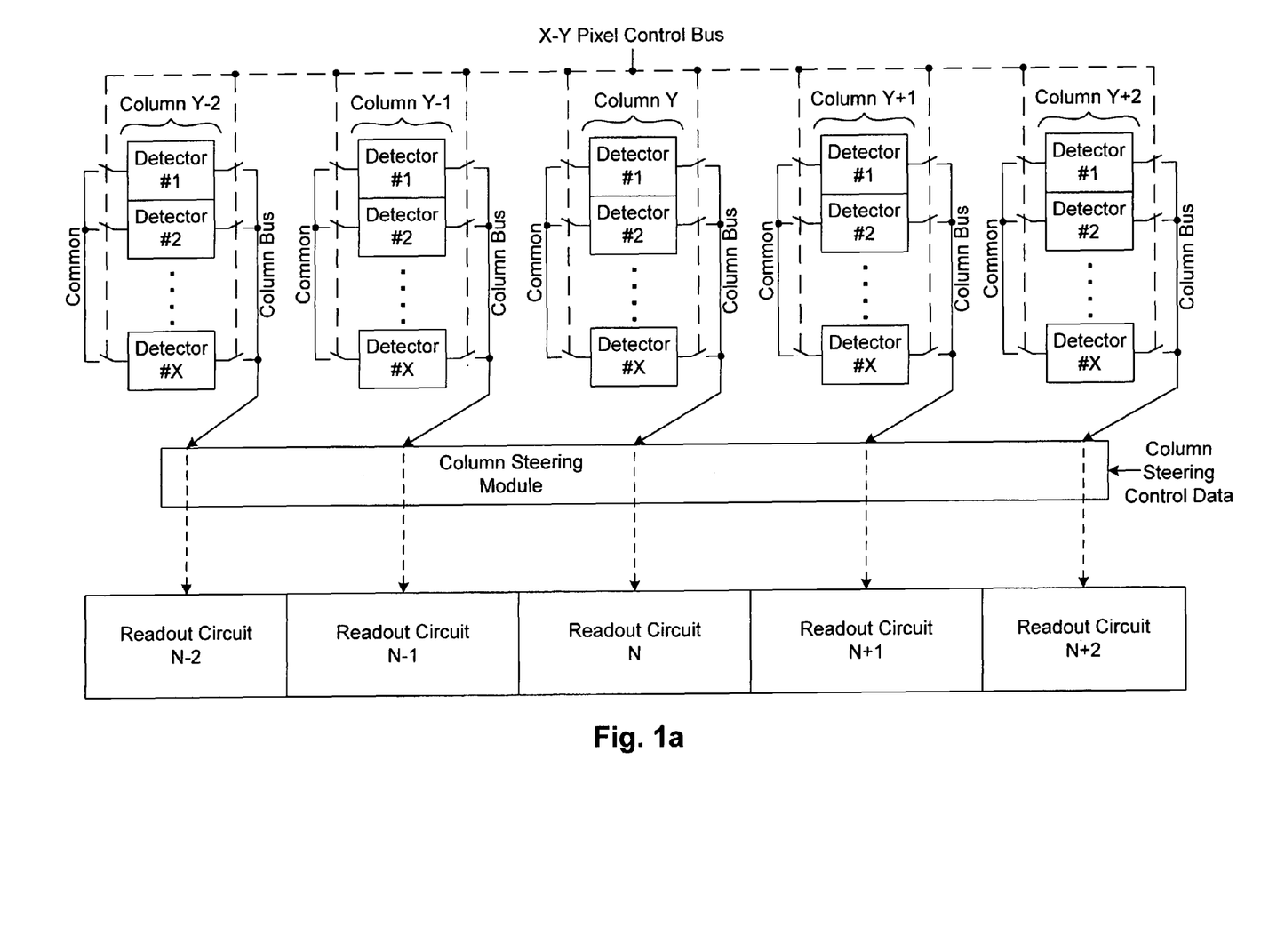
FIG. 1a is a block diagram of an imaging system configured with readout circuit redundancy in accordance with an embodiment of the present invention, and operating with no defective readout circuits present.

FIG. 1a is a block diagram of an imaging system configured with readout circuit redundancy in accordance with an embodiment of the present invention, and operating with no defective readout circuits present. The system includes an imaging array of detectors, a column steering module, and a number of column readout circuits.

As can be seen, the array is formed of a number of columns, with columns Y−2 to Y+2 shown. Each column has a number (X) of addressable detectors. It will be appreciated that any number of columns can be used, as well as any number of detectors per column, depending on the particular application. Each detector represents a pixel of the array. In general, larger imaging arrays will have a greater number of columns and/or detectors per column than smaller arrays. Typical array sizes range from 256×256 to 1024×1024 to 1024×4096 to 16384×16383 pixels. Note that X-Y symmetry is not necessary.

The detectors can be, for example, quantum well infrared photodetectors (QWIPs), quantum dot infrared photodetectors (QDIPs), charge coupled devices (CCDs), or microbolometers. Each of the detectors is addressable individually or as part of a group. The X-Y control bus provides the control signals that switch in the detectors selected for readout as is conventionally done, where each selected pixel is electrically coupled to a common and the column bus. The charge acquired by each detector is then provided to a readout circuit by way of the column steering module.

The column steering module functions in response to the column steering control data that is applied to the module (e.g., by a local processor that is configured to assess the operational status of each readout circuit). Based on this control data input, the column steering module selects which column of detectors will be paired with a particular readout circuit.

In the example shown in FIG. 1a, each column of detectors is electrically connected to a common readout circuit directly adjacent to that column. This pairing of detector columns and adjacent readout circuits could be the primary or default configuration. Such a default configuration could be used, for example, when none of the readout circuits are defective. Note, however, that numerous default configurations are possible here.

The readout circuits can be implemented in conventional technology, and may include, for example, amplifiers, integrators, offset circuits, address registers, and A/D converters. Additional circuitry may be included in the readout circuits as well, including other desired conventional signal conditioning circuitry, and custom circuitry for carrying-out various desired functionality.

Figure 1B:
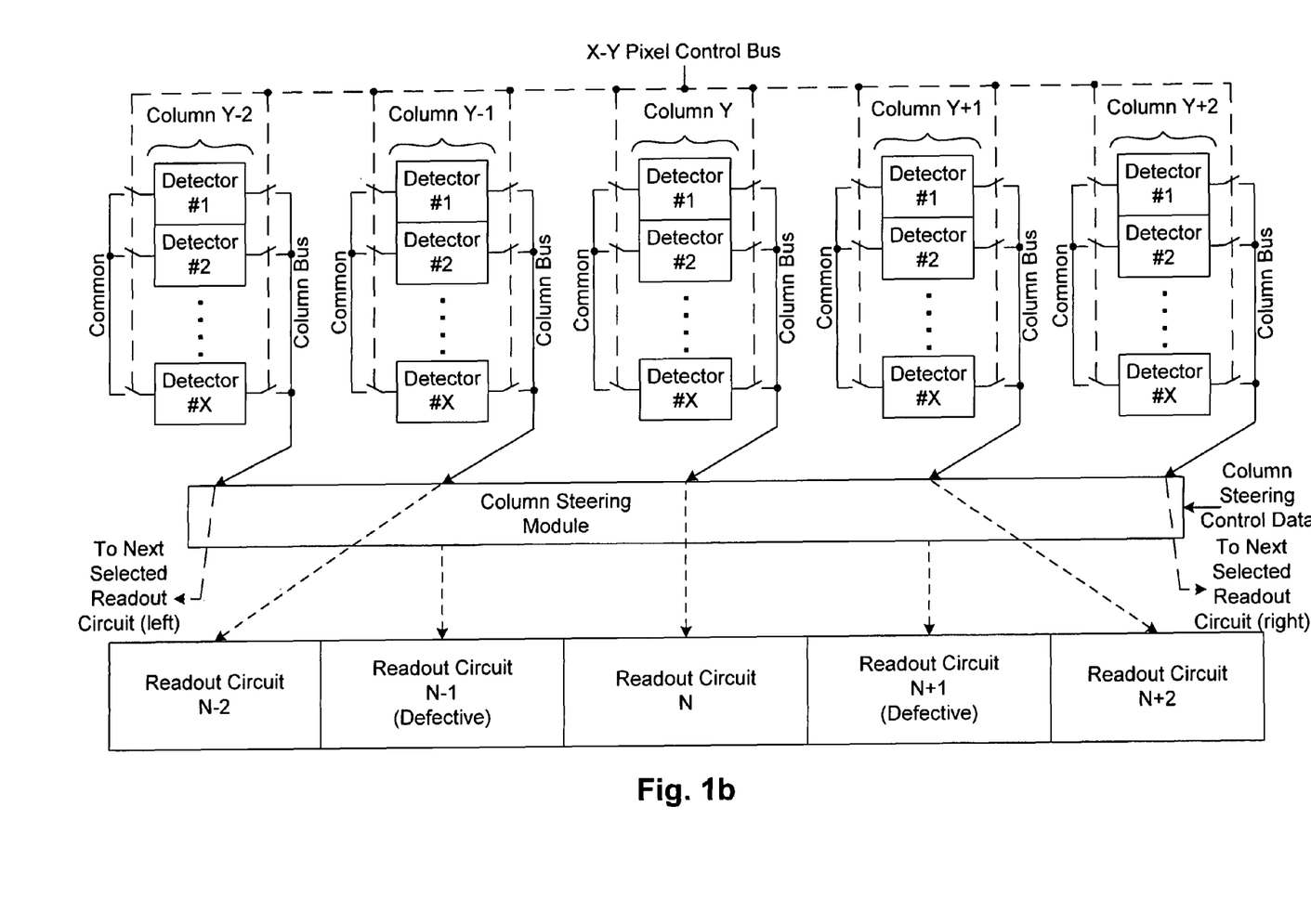
FIG. 1b is a block diagram of the imaging system of FIG. 1a operating at full pixel readout, despite having defective readout circuits.

FIG. 1b is a block diagram of the imaging system of FIG. 1a operating at full pixel readout, despite having defective readout circuits. As can be seen, two of the readout circuits are defective (i.e., readout circuits N−1 and N+1). These defective readout circuits can be identified by any diagnostic means, whether performed offline during testing and/or troubleshooting sessions, or performed real-time in the field to periodically assess the operational status of each of the readout circuits. Numerous diagnostic testing schemes will be apparent in light of this disclosure.

In any case, the column steering module is configured to selectively steer the detector columns around the identified or known defective readout circuits, so that each detector column will be able to report its acquired data. The control data input of the column steering module reflects knowledge of any defective readout circuits, thereby effectively directing the selective steering. Note that the control data input may further include necessary clocking and enable signals, depending on the implementation. As previously discussed, the knowledge of defective readout circuits can be acquired during offline testing or in real-time.

For example, the defective readout circuit information represented in the control data input can be acquired during off-line testing and/or trouble shooting after the manufacturing process is complete. Alternatively, the defective readout circuit information represented in the control data input can be acquired real-time using an on-board diagnostic processor. Once the control data is acquired, it can be stored locally in the column steering module (e.g., in an EPROM). Alternatively, the column steering module can be configured so that the control data is effectively hardwired into the module. Note that on-board diagnostic capability enables real-time failover, should a readout circuit fail after the imaging system is deployed in the field.

The optional on-board diagnostic process could be performed periodically, for instance, between imaging sessions or at pre-set times, by applying a known test signal to each readout circuit input and monitoring the respective output signals (e.g., to make sure the readout circuit switches between two known conditions corresponding to forced input conditions). The monitoring and output signal analysis could be carried out, for example, by a programmable DSP processor or other suitable processing environment. In any case, the output test signal of a functional readout circuit would have predictable parameter values (e.g., start and stop voltage levels, amplitude, rise and fall times, and frequency/period), based on the known integration, amplification, digitization, and other processes performed by the readout circuits. Thus, readout circuits providing non-compliant outputs could be identified as defective. Numerous diagnostic techniques and schemes can be employed here.

In the example case shown in FIG. 1b, the detector columns Y−1 and Y+1 are steered around their respective primary readout circuits (which are defective), and are connected to neighboring or spare readout circuits. If the neighboring or spare readout circuit is currently assigned to a detector column, then that detector column can be steered to the next selected or otherwise available readout circuit (which can be in the left or right direction), and so on.

Note that spare readout circuits can be built-in throughout a line of primary readout circuits, so that each primary readout circuit has a backup circuit. Alternatively, the spares can be limited to a subset of the total number of readout circuits. Various primary/backup and spare circuit schemes can be used here, as will be apparent in light of this disclosure. In any case, the data from ideally all detector columns is retrieved, despite defective readout circuitry.

Note that the array, column steering module, and the readout circuits can be implemented on a single chip or chip set. Likewise, image processing circuitry, as well as any diagnostic processor and/or control circuitry, can also be implemented on the chip or chip set. Alternatively, each of the array, column steering module, readout circuits, and image processing can be implemented separately, and the control signals can be provided remotely or be preprogrammed based on offline diagnostics. Any of a number of such configurations can be implemented here.

System Architecture

Figure 2A:
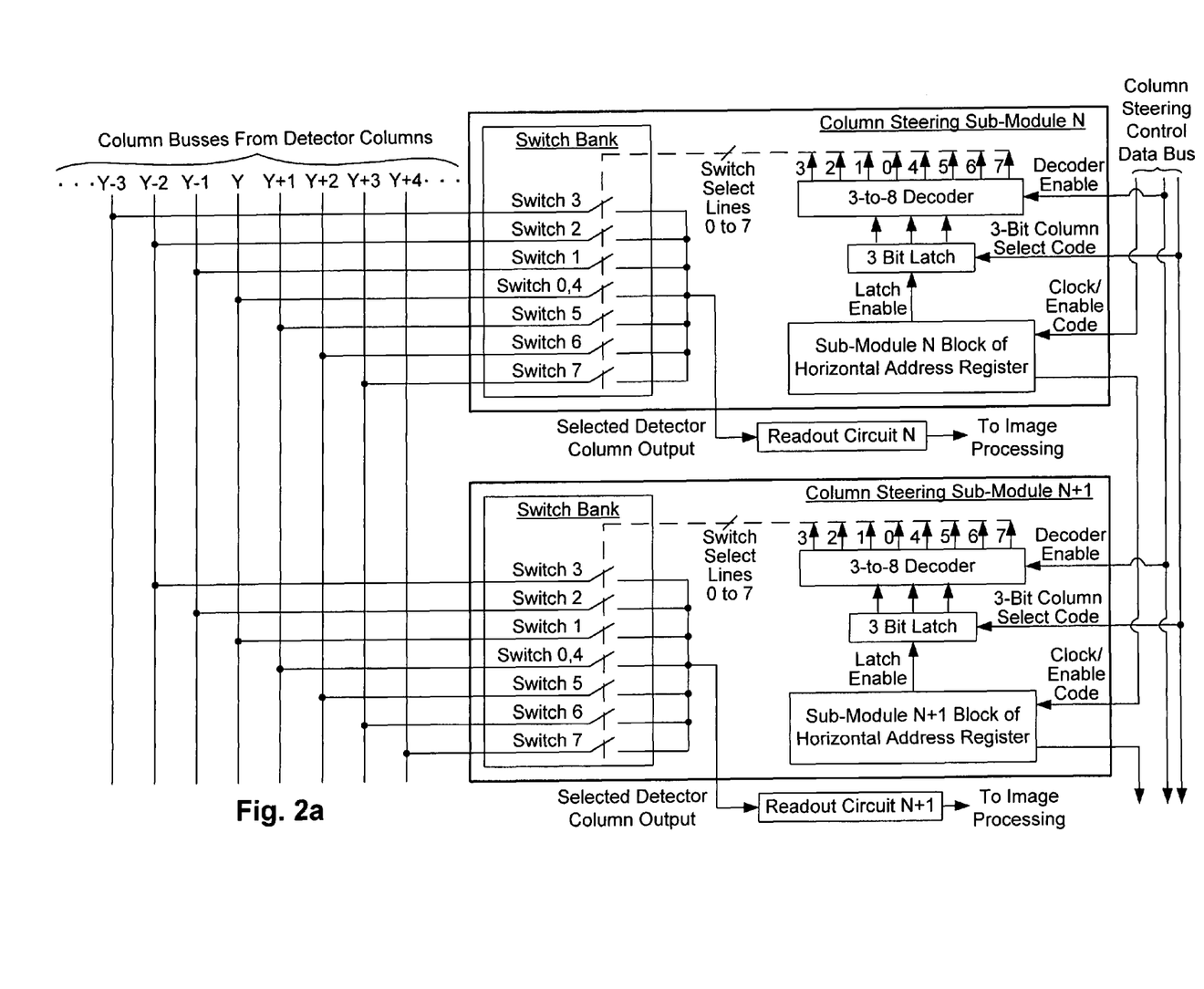
FIG. 2a is a schematic diagram of a column steering module configured to provide an imaging system with readout circuit redundancy in accordance with an embodiment of the present invention.

FIG. 2a is a schematic diagram of a column steering module configured to provide an imaging system with readout circuit redundancy in accordance with an embodiment of the present invention. This column steering module could be used, for example, as shown in FIGS. 1a and 1b. Note that many other embodiments of this steering module can be used, depending on level of integration, the overall circuit area constraints, ease of use and clocking requirements. Alternative steering modules will be apparent in light of this disclosure, and can be implemented using digital logic and any number of switching/multiplexing schemes.

As can be seen, the overall column steering module is made up of a number of column steering sub-modules, where the number of sub-module/readout circuit pairs is at least one greater than the number of detector columns (so as to provide redundancy for defective readout circuits). Only the steering sub-modules N and N+1 (and their corresponding readout circuits) are shown. The use and electrical connection of additional steering sub-modules will be apparent in light of this disclosure.

To ensure all detector columns are read, there ideally should be an extra sub-module/readout circuit pair for each defective readout circuit. For example, assume an imaging system that has an array made up of 100 detector columns. If it is desired to protect for up to 10 defective readout circuits in this particular imaging system, then there should be 10 extra or spare column steering sub-module/readout circuit pairs, in addition to the 100 primary sub-module/readout circuit pairs, for a total of 110 pairs.

Note that the use of the terms "primary" and "spare" are not intended to imply any rigid framework, in that any one detector column can be connected to any column steering sub-module/readout circuit pair to which it has access. Embodiments of the present invention can be configured to provide any degree of flexibility in carrying out the failover process, as desired.

Further note, that even though the ideal case is indicated as being one where all detector columns are read, there may be instances where this result cannot be achieved. Consider the case, for example, where the number of defective readout circuits exceeds the number of spare column steering sub-module/readout circuit pairs. The present invention is not intended to be limited to cases where all detector columns are read, but can be applied to any case where the goal is to eliminate or otherwise reduce lost detector column data due to defective readout circuits.

In the embodiment shown in FIG. 2a, each sub-module includes a switch bank (e.g., 8 switches), a horizontal address register, a 3-bit data latch, and a 3-to-8 line decoder. Each horizontal address register is effectively one unit or block of a shift register included in the overall column steering module. The control data can be loaded and then clocked through the shift register to enable each of the sub-module/readout circuit pairs so as to carry out the detector column readout process. Again, the control data can be provided in real-time, for example, by an on-chip diagnostic process. Alternatively, the control data can be preprogrammed into a local memory, for example, once the defective readout circuits have been identified during offline testing.

The 3-bit latch can be implemented, for example, with three conventional 1-bit data latches, and stores the 3-bit column select code provided by the column steering control data bus. The 3-to-8 line decoder can be implemented with conventional digital logic (e.g., similar to that used for a 74LS138 3-to-8 line decoder). Other decoders and demultiplexers, including custom designs, can be used here as well, where the resulting functionality allows the 3-bit column select code to be translated into a switch select enable signal.

The switches of the switch bank each couple to a column bus providing output from one of the detector columns. The switches can be, for example, field effect transistors (FETs), which readily integrate into a chip design. Note that the column busses are connected to the switches of each sub-module in a staggered fashion. Staggered refers to the grouped advancement of column busses connected to the column steering sub-modules. This staggered switching scheme is consistent for each consecutive column steering sub-module not shown.

For instance, column busses Y−3 to Y+3 are connected to sub-module N; column busses Y−2 to Y+4 are connected to sub-module N+1; column busses Y−1 to Y+5 are connected to sub-module N+2; column busses Y to Y+6 are connected to sub-module N+3, and so on. Further note that any of the detector busses connected to a particular sub-module can be coupled to the readout circuit associated with that sub-module. Thus, any one detector column bus is selectively connected or "steered" to any one of the seven readout circuits connected to that detector column by the switch bank of the corresponding column steering sub-module. Any defective readout circuits will be unused by the detector columns.

In operation, an enable code is clocked into the first horizontal address register (which is the first block of a shift register). The clocked-in enable code effectively addresses or enables the 3-bit latch of the corresponding sub-module. The 3-bit column select code that is then available on the column steering control data bus is latched into the 3-bit data latch. The 3-bit column select code, which can be provided to the control data bus by a local processor or memory, reflects knowledge of defective readout circuits associated with the imaging system, and is adjusted for each defective readout circuit in the system that is corrected with a spare. If the 3-to-8 line decoder is enabled (based on the decoder enable line from the control data bus), then the pixel data from the detector column bus specified by the latched 3-bit column select code is then switched through the bank for readout and image processing. Note that if the current readout circuit is defective, then the 3-to-8 line decoder is disabled, which puts the switch select lines in a tri-state or high impedance mode so that no switches of the switch bank are activated. In this case, the defective sub-module/readout circuit pair will simply be passed over.

The shift register of the column steering module is then clocked again, so that the enable code currently in the first horizontal address register is clocked into the second horizontal address register (which is the second block of a shift register). The clocked in enable code enables the 3-bit latch of the corresponding sub-module. The 3-bit column select code that is now available on the column steering control data bus is latched into the 3-bit data latch. If the 3-to-8 line decoder is enabled (based on the decoder enable line from the control data bus), then the pixel data from the detector column bus specified by the latched 3-bit column select code is then switched through the bank for readout and image processing. If the current readout circuit is defective, then the 3-to-8 line decoder is disabled, that sub-module/readout circuit pair is passed over. Note that the 3-bit column select code for this detector column will be the same as the code from the last detector column processed if no intervening defective readout circuits have been passed over. However, the code will increment (or decrement, depending on shift perspective) one bit for each defective readout circuit passed over.

The clocking/enabling process repeats until each sub-module/readout circuit pair is addressed to provide a full set of pixel data for imaging.

Note that the components are shown as sub-modules only to facilitate explanation, and the present invention is not intended to be limited to any one particular implementation. Rather, embodiments of the present invention can be implemented as a chip or chip set (imaging system on a chip), or as a number of operatively coupled discrete modules and/or sub-modules.

Column Select Code

Figure 2B:
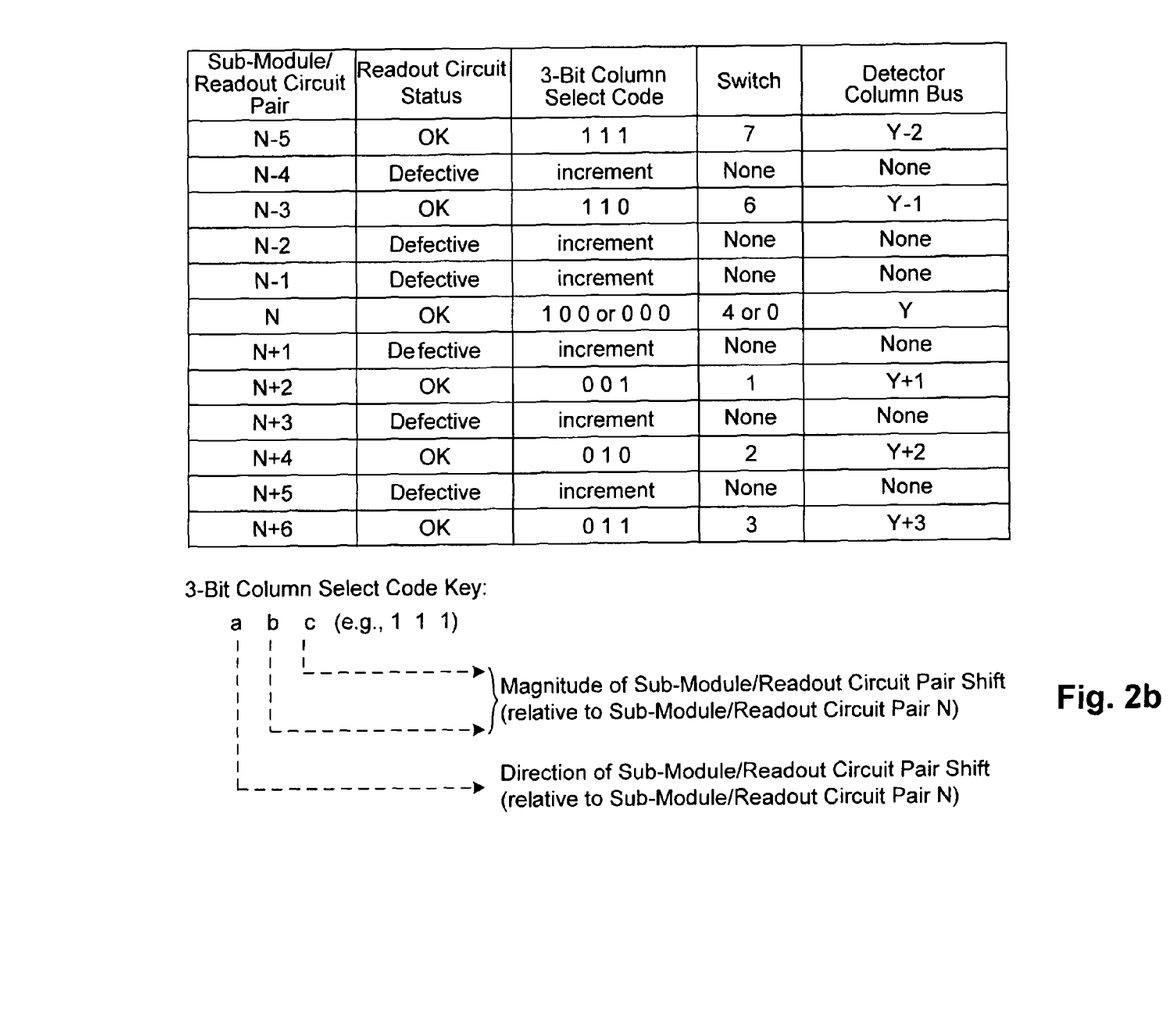
FIG. 2b is a table illustrating example detector column select codes and corresponding switch positions for a column steering module configured in accordance with an embodiment of the present invention.

FIG. 2b illustrates example 3-bit column select codes and corresponding switch positions for a column steering module configured in accordance with an embodiment of the present invention. In this case, the imaging system supported by the column steering module has six primary column steering sub-module/readout circuit pairs, and six spare column steering sub-module/readout circuit pairs. The sub-module/readout circuit pairs and detector columns are labeled to simplify understanding, with the sub-module/readout circuit pair N corresponding to detector column bus Y. The column select code is 000 or 100, which means that center switch position (switches 0,4, which are tied together in this example configuration) will be used to connect the column bus Y to the sub-module/readout circuit pair N.

As can be seen in FIG. 2b, the most significant bit (a) of the column select code indicates the direction of the shift relative to the center switch position 0,4. For instance, if the MSB of the column select code is logical 1, then the shift direction is toward readout circuit N−5. On the other hand, if the MSB of the column select code is logical 0, then the shift direction is toward readout circuit N+6. The two least significant bits (b and c) of the column select code indicate the magnitude of the shift relative to the center switch position 0,4. Recall that for each defective readout circuit encountered, the magnitude of the shift increments (or decrements) by one.

For instance, note that sub-module/readout circuit pairs N−1 and N−2 are defective, and N−3 is the first functional readout circuit in that direction relative to readout circuit N. The magnitude of the shift relative to readout circuit N is therefore two (i.e., the number of defective readout circuits passed over to get to the next functional readout circuit). As such, the two LSBs of the column select code for readout circuit N−3 are logical 1 and 0, respectively (which is 2 in binary). Similarly, readout circuit N−4 is also defective, thereby bringing the total number of passed over defective readout circuits to three, in order to get to the functional readout circuit N−5. As such, the two LSBs of the column select code for readout circuit N−5 are logical 1 and 1, respectively (which is 3 in binary).

In the opposite direction (toward N+6), the first defective readout circuit is N+1 and the first functional readout circuit is N+2. The magnitude of the shift relative to readout circuit N is therefore one. As such, the two LSBs of the column select code for readout circuit N+2 are logical 0 and 1, respectively (which is 1 in binary). The next defective readout circuit in that direction is N+3 and the next functional readout circuit is N+4. The magnitude of the shift is therefore two. As such, the two LSBs of the column select code for readout circuit N+4 are logical 1 and 0, respectively (which is 2 in binary). The last defective readout circuit in that direction is N+5 and the last functional readout circuit is N+6. The magnitude of the shift is therefore three. As such, the two LSBs of the column select code for readout circuit N+2 are logical 1 and 1, respectively (which is 3 in binary).

As will be appreciated, only one of the switch select lines is active at a time. The decimal equivalent of the 3-bit column select code indicates which of the decoder outputs (0 through 7) will be active. For instance, the select code for readout circuit N+5 is logical 111. Thus, output 7 of the decoder will be active (e.g., logical high), while the other decoder outputs 0 through 6 remain inactive (e.g., logical low). Switch select line 7 then activates switch 7 of the bank, thereby causing detector column bus Y−2 to be switched to readout circuit 5 for readout. For the readout circuits that are defective, recall that the decoder is not enabled. Thus, all of the detector outputs 0 through 7 for that particular sub-module will be put in a high impedance mode, and switch select lines 0 through 7 will therefore all remain inactive (e.g., logical low).

Enable Code

Figure 2C:
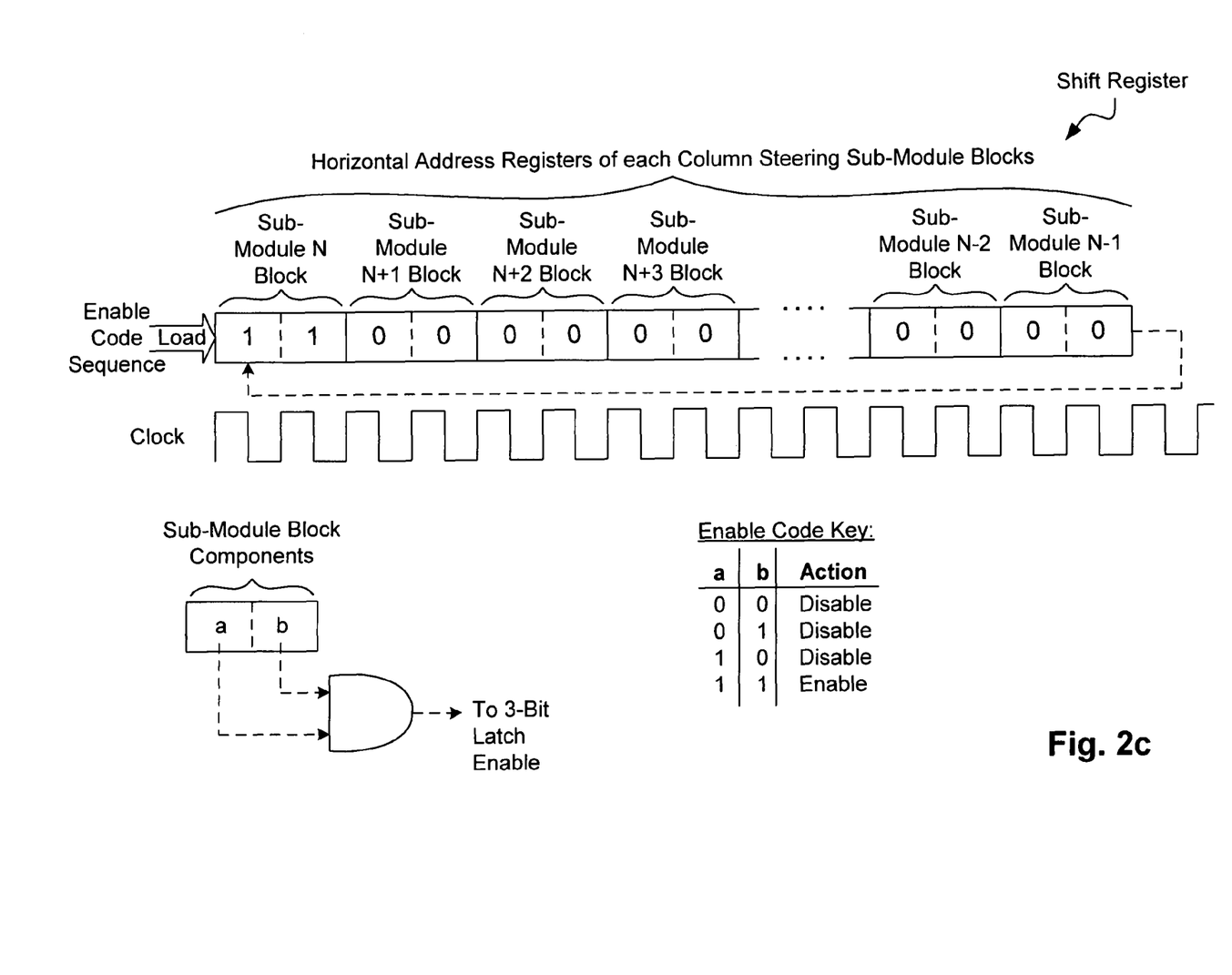

FIG. 2c illustrates how the sequence of an enable code is clocked through the horizontal address registers that make up the overall shift register of the column steering module.

As previously explained, the enable code sequence can be loaded prior to deployment, and/or can be updated real-time after deployment. In this particular embodiment, the enable code is two bits long (logical 1 1). The other bits of the sequence are set to logical zero, so that only the sub-module having the enable code 1 1 in its horizontal address register will be enabled. The logical 0 0 disables the other sub-modules. A double clock cycle is used to advance the enable code sequence through the blocks of the shift register, thereby sequentially enabling each sub-module so that detector column readout can take place. Note that the end of the enable code sequence is recycled back to the beginning of the sequence, so that the shifting process can be run continuously if so desired.

The two bits (a b) of each block of the enable code sequence are provided to an AND gate, and the output is applied to the 3-bit latch enable. Thus, only when a and b of a sub-module address register are both logical 1 will that sub-module be enabled to switch through detector column data to a readout circuit. Note that the enable code can vary in length and complexity, depending on the application. For instance, the enable code can be 1 bit in applications where each sub-module block (each horizontal address register) is a single bit in length. Alternatively, a longer enable code such as logical 110010 can be used for applications where each sub-module block is six bits in length. The complexity of the enable code will depend on a number of factors, such as desire to reduce "false" enablements and the size of the shift register.

Figure 3A:
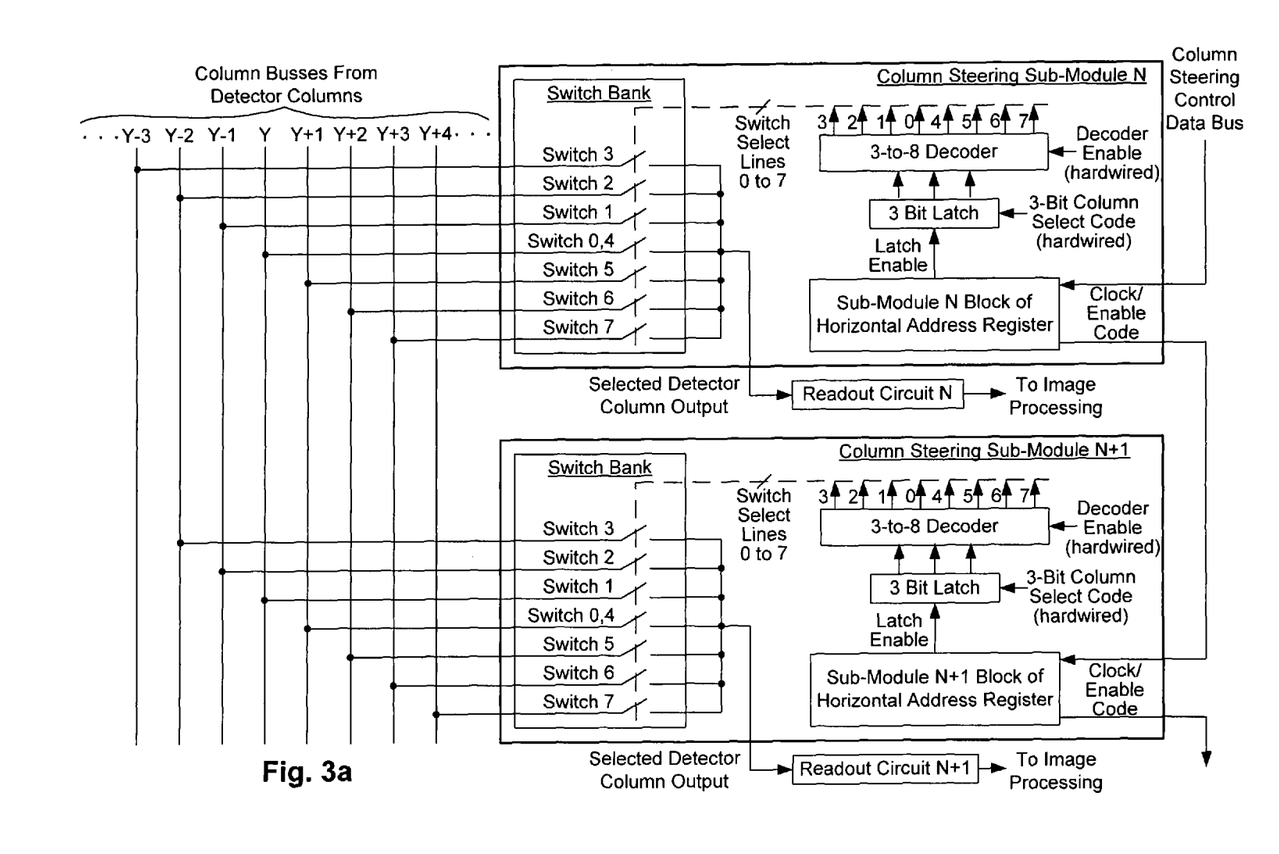
FIG. 3a is a schematic diagram of a column steering module configured to provide an imaging system with readout circuit redundancy in accordance with another embodiment of the present invention.

FIG. 3a is a schematic diagram of a column steering module configured to provide an imaging system with readout circuit redundancy in accordance with another embodiment of the present invention. In this case, the decoder enable and the 3-bit column select codes are hardwired. One application for this configuration is as follows. The imaging system that is supported by the column steering module is fabricated and then performance tested to identify any defective sub-module/readout circuit pairs.

Each of the sub-modules that are associated with a defective readout circuit are then configured so that the detector enable is hardwired to the disable level. Thus, these sub-modules will not select any of the switches in the bank and will effectively be passed over, even though the enable code will be clocked through their respective horizontal address registers. In addition, the 3-bit column select codes are hardwired into the 3-bit latch inputs.

Assume, for example, that the first two columns of the table shown in FIG. 2b represent the performance testing results of an imaging system. Here, the system includes twelve sub-module/readout circuit pairs, with six of them being defective. Thus, sub-module/readout circuit pairs N−4, N−2, N−1, N+1, N+3, N+5 will each have their respective decoder enable lines hardwired to the disable level (e.g., logical 0 or ground). In addition, the 3-bit column select code for N−5 would be hardwired to logical 1 1 1; the 3-bit column select code for N−3 would be hardwired to logical 1 1 0; the 3-bit column select code for N would be hardwired to logical 1 0 0 or 0 0 0; the 3-bit column select code for N+2 would be hardwired to logical 0 0 1; the 3-bit column select code for N+4 would be hardwired to logical 0 1 0; and the 3-bit column select code for N+6 would be hardwired to logical 0 1 1.

Parallel Readout of Detector Columns

Note that the other functional aspects of the column steering module can be the same as described in reference to the embodiment shown in FIG. 2a.

Figure 3B:
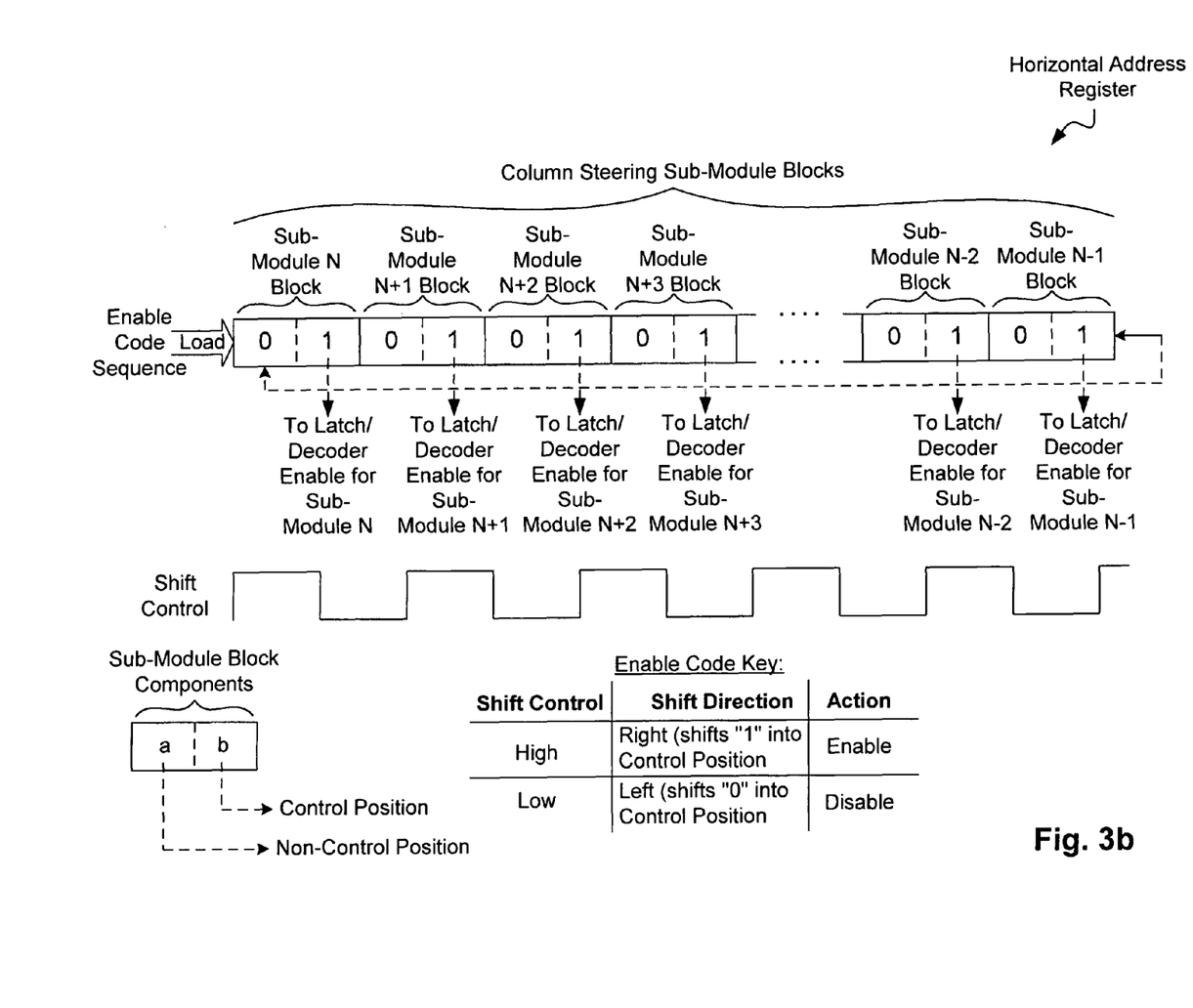

Alternatively, a bi-directional shift scheme can be employed as shown in FIG. 3b. Here, each of the detector columns can be read in parallel as opposed to one at a time. In more detail, and as discussed in reference to FIG. 3a, the enabled sub-modules are dictated by the hardwired decoder enable inputs and the 3-bit column select codes, which are hardwired based on knowledge of the defective sub-module readout circuit pairs. In addition, each horizontal address register includes a non-control position (a) and a control position (b). The enable code sequence is set so that a 1-bit shift in one direction will load a logical 1 in each control position, thereby enabling parallel readout of the detector columns. Then, a 1-bit shift in opposite direction will load a logical 0 back into each control position, thereby disabling parallel readout of the detector columns.

As previously explained, each horizontal address register is one block of an overall shift register. This shift register can be implemented, for example, on an overall chip with any standard bi-directional shift register design using standard general purpose or custom registers. A shift control signal provided to the bi-directional shift register determines the direction of the shift. For example, the shift direction is set to right shift when logical 1 is to be clocked into the control position, thereby enabling readout of the detector columns. Then, the shift direction is set to left shift when logical 0 is to be clocked back into the control position, thereby disabling readout. The shift control signal can be provided, for example, on the control data bus by a local control processor. Alternatively, a remote processor can be used to provide the control signals.

Figure 4:
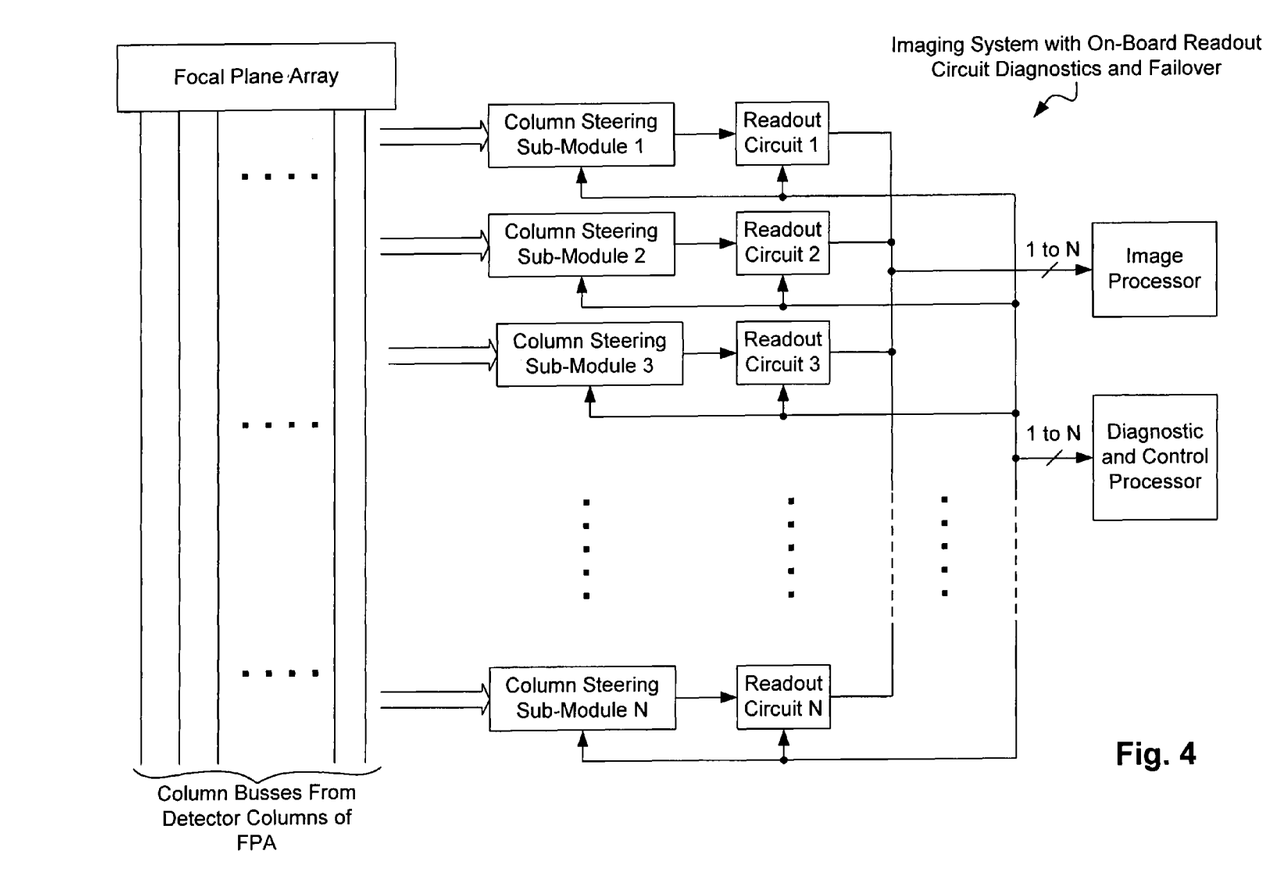
FIG. 4 is a block diagram of an imaging system configured with on-board readout circuit diagnostics and redundancy in accordance with another embodiment of the present invention.

FIG. 4 is a block diagram of an imaging system configured with on-board readout circuit diagnostics and redundancy in accordance with another embodiment of the present invention. The system can be implemented as an integrated circuit chip or chip set, or as a number of discrete components populated on one or more printed wiring boards. Applications for the system might include, for instance, a camera or a targeting/tracking function.

As can be seen, the system includes a focal plane array that is comprised of a plurality of detector columns, with each column adapted to provide its output on a corresponding column bus. The detector column outputs are combined into groups, and each group is switchably coupled to one of N column steering sub-modules in a staggered fashion, as described herein. Each of the column steering sub-modules is operatively coupled to a corresponding readout circuit (1 through N). Thus, each of the detector column outputs can be switched into at least two different readout circuits, thereby providing redundancy in case of a detected readout circuit failure.

A diagnostic and control processor is operatively coupled to each of the sub-modules and readout circuits, and is programmed or otherwise configured to periodically assess the status of each sub-module/readout circuit pair (by way of real-time diagnostic testing), and to provide control data to the column steering sub-modules, thereby maximizing readout of the pixel data yield. An image processor is also provided, which is configured to receive the readouts from each of the enabled readout circuits, and to perform the desired image processing as is conventionally done.

Note that these two processors are shown as separate for purpose of illustration, but it will be appreciated that the a single processor could be configured to carry out both sets of functions. The processors could be implemented, for example, with a microcontroller or other suitable processing environment configured with I/O capability and a number of programmed routines for carrying out the diagnostic testing and/or column sub-module control.

The diagnostic and control processor could be programmed to switch the sub-modules into a diagnostic mode (e.g., so that input signals are taken from the processor and not the column busses). Once in diagnostic mode, the processor can then provide a full complement of column select codes, enable sequences, and clocking, so that each sub-module's switching paths and overall functionality could be confirmed as operational. In addition, the processor can be programmed to provide test input to each readout circuit (either directly or via the corresponding column steering sub-module), so as to confirm the operational status of the readout circuits.

Once diagnostic testing is complete (whether performed by on-board diagnostic processing, or offline), any defective sub-modules and/or readout circuits are known. Based on this information, the diagnostic and control processor can be further configured to generate the column select codes, as well as the enable code sequence and decoder enable scheme. Once the codes and enable scheme is in place, the imaging system can be deployed for use in the field.

Note that the diagnostic and control processor can be eliminated if so desired, where the column select codes, enable code sequence, and decoder enable scheme are hardwired or otherwise built into the imaging system, after offline testing has determined the functional status of the sub-module/readout circuit pairs.

The foregoing description of the embodiments of the invention has been presented for the purposes of illustration and description. It is not intended to be exhaustive or to limit the invention to the precise form disclosed. Many modifications and variations are possible in light of this disclosure.

For example, not all embodiments require a 3-bit latch and 3-to-8 line decoder. In one such case, a single bit can be used to indicate whether a column is to be shifted or not, with a dependence on whether the previous column was shifted. Here, each readout circuit can be associated with a shift register containing the single bits that reflect knowledge of the defective readout circuits. Such a configuration allows the user to steer around one defective readout circuit at a time, and has no redundancy. However, it uses low power, takes very little chip area, and is commanded with one simple sequence (stored in shift registers) so it requires very little system overhead (e.g., no clock, decoder enable, or column select codes). Ultimately, the column steering module configuration selected should be appropriate for the system constraints at hand, such as available chip area, desired interface and circuit complexity, redundancy (or lack thereof), and amount of power consumption.

It is intended that the scope of the invention be limited not by this detailed description, but rather by the claims appended hereto.

What is claimed is:

1. An imaging system generating increased pixel readout by compensating for failed read out circuits by employing redundant readout circuits, said system comprising:
   a focal plane imaging array (FPA);
   said FPA comprising a plurality of detector columns;
   a plurality of primary readout circuits (ROCs) that receive and process image data from said plurality of detector columns of said FPA, wherein number of said plurality of detector columns and number of said plurality of primary readout circuits is equal;
   a plurality of said redundant ROCs replacing one or more of said plurality of primary ROCs if one or more of said plurality of primary ROCs fails;
   at least one column steering module consisting of a plurality of column steering sub-modules, each said column steering sub-module comprising,
   input from said plurality of detector columns,
   a selected detector column output,
   a switch bank comprising switches directing output from said plurality of detector columns to readout circuits by said selected detector column output,
   a 3 to 8 decoder coupled to said switch bank by switch select lines, said 3 to 8 decoder receiving a decoder enable signal,
   a 3-bit latch receiving a latch enable signal from a sub-module block of horizontal address register, said 3 bit latch also receiving a 3-bit column select code;
   wherein said plurality of detector columns is connected to said switches of said switch bank in a staggered fashion, wherein said staggered fashion denotes grouped advancement of detector column busses connected to said column steering sub-modules, whereby any one bus of said plurality of detector columns is selectively steered to any one of seven ROCs connected to said plurality of detector columns by said switch bank of corresponding said column steering sub-module, and whereby said defective ROCs will be unused by said detector columns;
   wherein each said sub-module block of horizontal address register is one unit of a shift register whereby control data is loaded and then clocked through said shift register to enable each of pairs of said column steering sub-modules and said ROCs to carry out detector column readout;
   wherein said 3-bit latch translates a 3-bit column select code into a switch select enable signal, wherein most significant bit (MSB) of said 3-bit column select code denotes shift direction and least significant bits (LSBs) indicate shift magnitude relative to a center position, and wherein only one of said switch select lines is active at a time;
   at least one column steering control data bus directing data of said at least one column steering module, said at least one column steering control data bus comprising at least clock/enable code lines of said sub-module block of horizontal address register;
   wherein said clock/enable code lines provide a double clock cycle whereby an enable code sequence is advanced through blocks of said shift registers, thereby sequentially enabling each said column steering sub-module, so that detector column readout takes place;
   at least one switch select circuit controlling operation of said switches;
   at least one ROC diagnostic processor that assesses status of pairs of said sub-modules and said ROCs, determining non-functionality of operation of connective wiring to and operation of said ROCs indicated by non-compliant output;
   at least one redundant readout circuit (ROC) control processor that controls when a redundant readout circuit replaces said primary readout circuit;
   at least one redundant readout circuit controller wherein said redundant readout circuit controller switchably couples said image data from said FPA from said primary readout circuit to said redundant readout circuit; and
   an image processor receiving readouts from said rocs that are enabled, to generate an image of said increased pixel readout.

2. The imaging system of claim 1, wherein said at least one column steering control data bus comprises lines of said decoder enable signal, lines of said 3-bit column select code, and dock/enable code lines of said sub-module block of horizontal address register.

3. The imaging system of claim 1, wherein said at least one column steering control data bus comprises clock/enable code lines of said sub-module block of horizontal address register and said decoder enable signal and said 3-bit column select code are hardwired.

4. The imaging system of claim 1, wherein there is a redundant ROC for each primary ROC.

5. The imaging system of claim 1, wherein said 3-bit latch comprises three 1-bit data latches.

6. The imaging system of claim 1, wherein said 3-bit column select code is hard-wired wherein each of said column steering sub-modules associated with a defective roc is hard-wired to a disabled level whereby said column steering sub-modules will not select any switches in said switch bank, being be passed over, even though said enable code is clocked through their respective horizontal address registers.

7. The imaging system of claim 1, wherein said at least one ROC diagnostic processor and said at least one redundant readout circuit (ROC) control processor are separate from onboard components of said imaging system, operating offline.

8. The imaging system of claim 1 wherein said at least one ROC diagnostic processor and said at least one redundant readout circuit (ROC) control processor are onboard components of said imaging system, operating in real time during operation of said imaging system.

9. The imaging system of claim 1, wherein said imaging system is a camera.

10. The imaging system of claim 1 wherein said imaging system is a targeting/tracker.

11. A method of generating increased pixel readout by compensating for failed read out circuits by employing redundant readout circuits, said method comprising the steps of:
   providing an imaging device comprising;
     a focal plane imaging array (FPA);
     said FPA comprising a plurality of detector columns;
     a plurality of primary readout circuits (ROCs) that receive and process image data from said plurality of detector columns of said FPA, wherein number of said plurality of detector columns and number of said plurality of primary readout circuits is equal;
     a plurality of said redundant ROCs replacing one or more of said plurality of primary ROCs if one or more of said plurality of primary ROCs fails;
     at least one column steering module consisting of a plurality of column steering sub-modules, each said column steering sub-module comprising,
     input from said plurality of detector columns,
     a selected detector column output,
     a switch bank comprising switches directing output from said plurality of detector columns to readout circuits by said selected detector column output,
     a 3 to 8 decoder coupled to said switch bank by switch select lines, said 3 to 8 decoder receiving a decoder enable signal,
     a 3-bit latch receiving a latch enable signal from a sub-module block of horizontal address register, said 3 bit latch also receiving a 3-bit column select code;
     wherein said plurality of detector columns is connected to said switches of said switch bank in a staggered fashion, wherein said staggered fashion denotes grouped advancement of detector column busses connected to said column steering sub-modules, whereby any one bus of said plurality of detector columns is selectively steered to any one of seven ROCs connected to said plurality of detector columns by said switch bank of corresponding said column steering sub-module, and whereby said defective ROCs will be unused by said detector columns;
     wherein each said sub-module block of horizontal address register is one unit of a shift register whereby control data is loaded and then clocked through said shift register to enable each of pairs of said column steering sub-modules and said ROCs to carry out detector column readout;
     wherein said 3-bit latch translates a 3-bit column select code into a switch select enable signal, wherein most significant bit (MSB) of said 3-bit column select code denotes shift direction and least significant bits (LS%) indicate shift magnitude relative to a center position, and wherein only one of said switch select lines is active at a time;
     at least one column steering control data bus directing data of said at least one column steering module, said at least one column steering control data bus comprising at least clock/enable code lines of said sub-module block of horizontal address register;
     wherein said clock/enable code lines provide a double clock cycle whereby an enable code sequence is advanced through blocks of said shift registers, thereby sequentially enabling each said column steering sub-module, so that detector column readout takes place;
     at least one switch select circuit controlling operation of said switches;
     at least one ROC diagnostic processor that assesses status of pairs of said sub-modules and said ROCs, determining non-functionality of operation of connective wiring to and operation of said ROCs indicated by non-compliant output
     at least one redundant readout circuit (ROC) control processor that controls when a redundant readout circuit replaces said primary readout circuit;
     at least one redundant readout circuit controller wherein said redundant readout circuit controller switchably couples said image data from said FPA from said primary readout circuit to said redundant readout circuit; and
   an image processor receiving readouts from said rocs that are enabled, to generate an image of said increased pixel readout;
     clocking said enable code into first said sub-module block of horizontal address register whereby said clocked-in enable code enables said 3-bit latch of corresponding said sub-module block of horizontal address register, said 3-bit column select code then available on said column steering control data bus;
     latching said 3-bit column select code into said 3-bit data latch, wherein said 3-bit column select code identifies said defective readout circuits;
     enabling said 3-to-8 line decoder based on decoder enable line from said at least one column steering control data bus, whereby pixel data from said detector column bus specified by said latched 3-bit column select code is switched through said switch bank for readout and image processing;
     disabling said 3-to-8 line decoder by said decoder enable line when current ROC is defective, whereby no switches of said switch bank are activated and said defective sub-module/readout circuit pair is passed over
     again clocking said column steering module shift register, whereby enable code currently in said first sub-module block of horizontal address register is clocked into second horizontal address register, wherein said 3-bit column select code for this detector column is enable select code from previous detector column processed if no intervening defective ROCS have been passed over, and said enable code will increment or decrement one bit for each defective readout circuit passed over;

enabling said 3-bit latch of corresponding column steering sub-module;
latching said clocked enable code now available on said column steering control data bus;
again enabling said 3-to-8 line decoder based on decoder enable line from said column steering control data bus, whereby pixel data from detector column bus specified by said latched 3-bit column select code is switched through said switch bank for readout and image processing;
again disabling said 3-to-8 line decoder by said decoder enable line when current roc is defective, whereby no switches of said switch bank are activated and said defective sub-module/readout circuit pair is passed over;
repeating said clocking enabling/disabling steps until each sub-module/readout circuit pair is addressed to provide a full set of pixel data for imaging.

12. The method of claim 11, wherein only one of the switch select lines is active at a time.

13. The method of claim 11, comprising a diagnostic mode wherein input signals are taken from a processor.

* * * * *